United States Patent Office 3,050,371
Patented Aug. 21, 1962

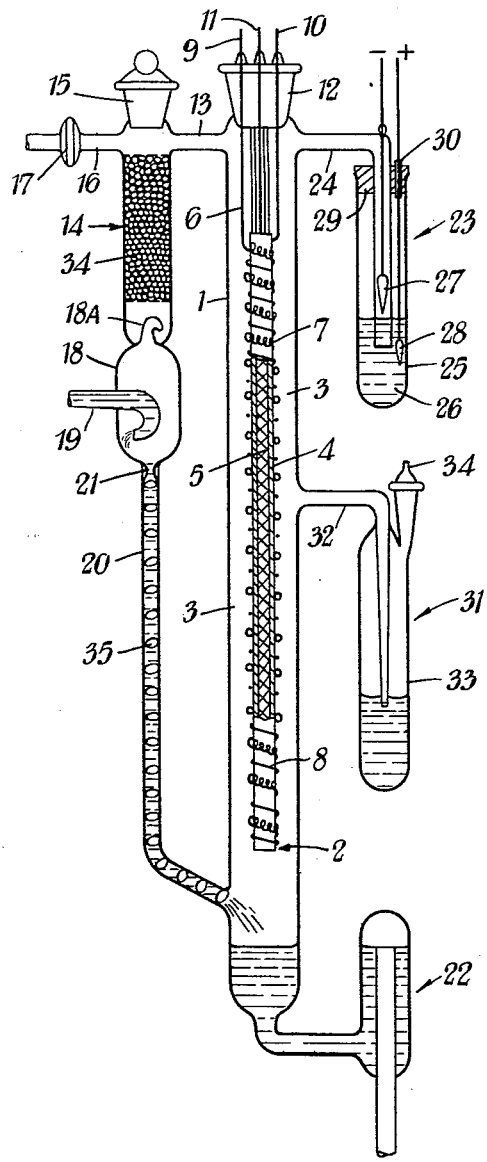

3,050,371
METHODS FOR DETECTING AND/OR MEASURING THE CONCENTRATION OF OXYGEN IN AQUEOUS LIQUIDS SUCH AS BOILER FEED WATER
Arthur Gordon Dowson and Ivor John Buckland, London, England, assignors, by mesne assignments, to Engelhard Industries, Inc., Newark, N.J., a corporation of Delaware
Filed Aug. 15, 1956, Ser. No. 604,233
Claims priority, application Great Britain Aug. 25, 1955
11 Claims. (Cl. 23—230)

This invention relates to a method and apparatus for detecting and/or measuring the concentration of oxygen in aqueous liquids, for example the concentration of dissolved oxygen in boiler feed water.

It is often required that the concentration of dissolved oxygen in an aqueous liquid should be as low as possible. It is especially important to control the oxygen content of the feed water in steam boilers in power stations, steamships, and the like, since any oxygen dissolved in the feed water causes corrosion of the boiler tubes. Up to the present the known methods of detecting and measuring the concentration of such oxygen are relatively insensitive, and sluggish in operation.

According to one aspect of the present invention there is provided a method of detecting and/or measuring the concentration of oxygen in an aqueous liquid, wherein the liquid, the oxygen content of which is to be determined, is caused to flow and an inert carrier gas (as hereinafter defined) is brought into intimate contact with the liquid in such a way that at least part of any oxygen contained in the liquid is transferred to the gas, the liquid and gas being thereafter separated one from the other, and wherein the gas so separated is caused to contact means adapted to give a response indicative of the amount of oxygen in the gas, the gas after contacting said means then being circulated for contact with further liquid.

According to another aspect of the present invention there is provided apparatus for detecting and/or measuring the concentration of oxygen in an aqueous liquid, wherein means adapted to give a response indicative of the amount of oxygen present in the ambient gas contacting said means, is disposed in a housing having an inlet and a gas outlet spaced from said inlet, there being means adapted to circulate as between said inlet and said outlet an inert carrier gas (as hereinafter defined) in such a way that the gas intimately contacts the liquid while the liquid is moving and that at least part of any oxygen contained in the liquid is transferred to the gas, the circulating means and/or the housing being so arranged that the gas is separated from the liquid before it is caused to contact the indicating means under the influence of the circulating means.

By the expression "an inert carrier gas" as used in this specification, there is meant a gas which will not cause a response on the indicating means, which will react neither with the liquid nor with oxygen on being brought into contact with the latter at ordinary temperatures, and which, if dissolved in the liquid will deleteriously affect neither the liquid if the latter is required for further use, nor any apparatus in which the liquid is subsequently contained or used. Examples of such a gas are hydrogen, argon and nitrogen, hydrogen being the preferred gas.

For a better understanding of the invention, and to show how the same may be carried into effect, reference will now be made to the accompanying drawing, which is an elevational view of an apparatus for measuring the concentration of dissolved oxygen in an aqueous liquid.

Referring now to the drawing, the apparatus comprises a tubular vessel 1 in which a galvanic cell 2 (shown partly in section) is disposed in a vertical position, there being an annular space 3 between the cell 2 and the inner wall of the vessel 1. The cell 2 consists of a tube 4 of porous synthetic plastic material such as polyvinyl chloride having a porosity in the region of 85%. The tube 4 is closed at its lower end, and is filled with an oxidisable anode material 5 consisting essentially of finely divided cadmium, and with an electrolyte consisting of an aqueous 5% solution of potassium hydroxide. The cathode 6 of the cell is constituted by coiled silver wire wound around the outside of the tube as at 7. A platinum wire 8 is separately wound around the outside of the tube 4, the use of the platinum wire 8 being for charging the cell. Separate leads 9, 10 and 11 extend from the silver wire cathode, the platinum wire, and the cadmium anode respectively, the leads 9, 10 and 11 being sealed through a stopper 12 which closes the top of the vessel 1.

A gas outlet pipe 13 leads from the top of the vessel 1 to a container 14 which is provided at its top with a stopper 15, and from which leads an outlet pipe 16 closed by a tap 17. The lower end of the container 14 is joined to the upper end of a chamber 18, the interior of the chamber 18 being in communication with the interior of the container 14 through a bent pipe 18A.

A liquid inlet pipe 19 is sealed into the wall of the chamber 18 and is arranged to discharge liquid into the chamber 18 at a location below the junction of the chamber 18 and the container 14. An outlet pipe 20 leads from the bottom of the chamber 18 into the vessel 1 at a location near the bottom thereof and below the lower end of the cell 2.

The outlet pipe 20 has, at 21, a restriction in diameter where it joints the chamber 18.

The lower end of the vessel 1 is connected to a device 22 for maintaining a constant head of liquid in the bottom of the vessel below the lower end of the cell 2, the constant head of liquid acting as a gas-tight seal and preventing air from entering the apparatus.

A make-up hydrogen device 23 is attached to the top of the vessel 1 by a pipe 24 which leads into a tube 25. The tube 25 contains a dilute aqueous electrolyte 26 such as dilute potassium hydroxide solution or dilute sulphuric acid and the pipe 24 is arranged with its outlet below the level of the electrolyte 26 in the tube 25. A lead to an electrode 27 is sealed through the pipe 24 and the electrode 27 is located slightly above the liquid in the tube, while a further electrode 28 is immersed in the electrolyte. The tube 25 is closed by a stopper 29 but is open to the atmosphere through a sleeve 30 which is located in the stopper 29 and through which the lead to the electrode 28 passes. The electrodes 27 and 28 are connected to a battery (not shown) in such a way that the electrode 27 is a cathode.

An excess gas blow-off device 31 is attached to the vessel 1 intermediate its ends, and consists of a pipe 32 leading from the vessel 1 into a tube 33 which is open to the atmosphere at 34. The tube 33 contains water and the pipe 32 is arranged with its end just below the level of the water in the tube 33.

In the use of the apparatus just described, the apparatus is filled with hydrogen, and the container 14 is filled with a bed of a palladium on alumina catalyst 34 on which hydrogen and oxygen can combine in flameless combustion at room temperature to produce water vapour. The liquid, e.g. water, the oxygen content of which is to be determined, enters the chamber 18 through the liquid inlet pipe 19. The water runs down the outlet pipe 20 and, aided by the restriction 21 formed therein sucks some of the hydrogen into such pipe, so producing a partial vacuum in the chamber after the manner of the well-known laboratory filter pump, and thus causing a circulation of hydrogen up the annular space 3, past the galvanic cell 2, through the outlet pipe 13 and the container 14, and into the chamber 18 where it is sucked down the outlet pipe 20 by the water.

The hydrogen is sucked down the outlet pipe 20 as bubbles 35 so that the oxygen-containing water intimately contacts the hydrogen in such a way that a proportion of the oxygen dissolved in the water is released into the hydrogen. On discharging into the bottom of the vessel 1, the water runs away through the constant head device 22, while the oxygenated hydrogen separates from the water and flows upwardly past the galvanic cell 2, the silver cathode 6 of which absorbs a proportion of the oxygen. An electric current is generated by the cell and is directly proportional to the amount of oxygen in the ambient gas flowing past the cell.

Since the cell 2 may remove only a proportion of the oxygen dispersed in the gas, it will be appreciated that by plain re-circulation of the gas the proportion of oxygen in the circulating gas will increase progressively until equilibrium is substantially established. This will not only cause the cell to generate a larger current, thus discharging the cell more rapidly, but following a change in oxygen content of the incoming liquid, some time will elapse before a new equilibrium is established. The bed of catalyst 34 in the container 14 ensures that the oxygen which has not been absorbed on the cathode 6 of the cell 2 is converted into water vapour by reaction with the hydrogen, so that the incoming liquid is at all times, brought into contact with oxygen-free hydrogen.

When hydrogen is used as the carrier gas there will be a slight loss of hydrogen due to the reaction occurring in the bed of catalyst. There will also be a slight loss of hydrogen which has dissolved in the liquid. It is therefore necessary to add hydrogen to the system to make up the loss and to maintain the system in the required balanced state. The hydrogen make-up device 23 serves to add the necessary hydrogen to the system.

When the pressure in the system decreases due to the combination and the dissolving of hydrogen, the liquid in the pipe 24 rises, and makes contact with the electrode 27, thus causing a current to flow through the two electrodes 27 and 28 and the electrolyte 26. Since the electrode 27 is a cathode, hydrogen will be evolved at this electrode and will flow into the system thus making good the hydrogen losses. When the pressure in the system reaches the required value, the liquid in the pipe 24 is forced back to its initial position, out of contact with the electrode 27, so that evolution of hydrogen ceases. However, should the pressure in the system rise beyond the required value the excess gas blow-off device 31 will become operative and the excess gas will be forced out to atmosphere through the pipe 32.

In the apparatus, the reaction at the galvanic cell is such as to cause the anode material to be attacked and oxidised. The anode material is a base metal which is readily attacked by the electrolyte in the presence of oxygen but which is not attacked in the absence of oxygen, and the anode material may be antimony, or massive lead, or preferably finely divided cadmium, in which case cadmium hydroxide $Cd(OH)_2$ is formed at the anode.

The cathode may be gold or platinum instead of silver, and the electrolyte of the cell, although preferably potassium hydroxide solution, can be an acid electrolyte, it being essential that the electrolyte does not attack the cathode either in the presence, or the absence of oxygen.

The galvanic cell employed in the apparatus may be modified, for example, by being made less sensitive in order to measure higher concentrations of oxygen, the cell being one which will produce an electric current proportional to the concentration of oxygen in gas supplied to the cell, and which will not produce a current in the absence of oxygen. However, the cell may be replaced by other known means for measuring the concentration of oxygen in the gas.

The galvanic cell has a significant temperature coefficient and for most accurate results it is preferable to insert the whole apparatus in a thermostatically controlled bath, although it may be sufficient to control the inlet temperature of the water.

In cases where the nature of the liquid or the process for which it is intended to be subsequently used preclude the use of hydrogen, another inert carrier gas (as hereinbefore defined) may be employed, and in such cases the catalyst 34 with its container 14, and the hydrogen make-up device 23 will not be included in the apparatus, and an alternative means of making up the inert carrier gas may be employed. The apparatus will still be useful but the response of the apparatus to a change in the oxygen content of the liquid will be less rapid, although the magnitude of the response may be greater.

In other cases, it may not be necessary entirely to exclude hydrogen, and another inert carrier gas containing a small proportion of hydrogen, sufficient to react with the oxygen in the circulating gas, may be employed.

We claim:

1. A process for determining the concentration of dissolved oxygen in a liquid which comprises continuously intimately contacting the entire body of liquid with an inert gas to form a gaseous admixture in the liquid phase, separating the gaseous admixture in the liquid phase into a gaseous phase and a liquid phase, the gaseous phase including at least a portion of the dissolved oxygen, and separating at least a portion of the oxygen from the gaseous phase by contacting the gaseous phase with the cathode of a galvanic cell whereby a current is generated which is proportional to the amount of oxygen separated.

2. A process for determining the concentration of dissolved oxygen in a liquid which comprises continuously intimately contacting in a first zone the entire body of liquid with an inert gas to form a gaseous admixture in the liquid phase, separating in a second zone the gaseous admixture in the liquid phase into a gaseous phase and a liquid phase, the gaseous phase including at least a portion of the dissolved oxygen, and separating at least a portion of the oxygen from the gaseous phase by contacting the gaseous phase with the cathode of a galvanic cell whereby a current is generated which is proportional to the amount of oxygen separated.

3. A process according to claim 1 in which the inert gas is hydrogen.

4. A process according to claim 3 in which the liquid is water.

5. A process according to claim 2 in which the inert gas is hydrogen.

6. A process according to claim 2 in which the liquid is water.

7. A process according to claim 2 in which the oxygen is separated from the gaseous admixture by adsorption.

8. A process for determining the concentration of dissolved oxygen in a liquid which comprises mixing the liquid with an inert gas in a first zone, passing the mixed gaseous and liquid phases to a second zone, separating a gaseous admixture from the liquid phase, separating at least a portion of the oxygen from the gaseous admixture by contacting the gaseous admixture with the cathode of a galvanic cell whereby a current is generated which is proportional to the amount of oxygen separated, passing the remaining gaseous admixture to a catalytic zone, removing the remaining oxygen from the inert gas, and recycling the inert gas to the first zone.

9. A process according to claim 8 in which the inert gas is hydrogen.

10. A process according to claim 8 in which the liquid is water.

11. A process according to claim 8 in which the oxygen is separated from the gaseous admixture in the second zone by absorption.

(References on following page)

References Cited in the file of this patent

UNITED STATES PATENTS

| | | |
|---|---|---|
| 1,919,858 | Pettingill | July 25, 1933 |
| 2,019,871 | Pettingill et al. | Nov. 5, 1935 |
| 2,104,759 | Randel | Jan. 11, 1938 |
| 2,114,234 | Ornstein et al. | Apr. 12, 1938 |
| 2,404,993 | Sullivan | July 30, 1946 |
| 2,651,612 | Haller | Sept. 8, 1953 |
| 2,713,010 | Bonner | July 12, 1955 |
| 2,760,922 | Williams | Aug. 28, 1956 |
| 2,805,191 | Hersh | Sept. 3, 1957 |

FOREIGN PATENTS

| | | |
|---|---|---|
| 707,323 | Great Britain | Apr. 14, 1954 |

OTHER REFERENCES

Zeitschrift für Anal. Chem., vol. 89, 1932, pages 361–362.

Mullen: Modern Gas Analysis, 1955, Interscience Publishers, Inc., New York, page 163.